(12) United States Patent
Park et al.

(10) Patent No.: US 7,859,628 B2
(45) Date of Patent: Dec. 28, 2010

(54) IPS LCD HAVING AUXILIARY COMMON ELECTRODE LINES

(75) Inventors: Jong-Jin Park, Seoul (KR); Hyeou-Ho Son, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 907 days.

(21) Appl. No.: 11/012,129

(22) Filed: Dec. 16, 2004

(65) Prior Publication Data

US 2005/0140903 A1 Jun. 30, 2005

(30) Foreign Application Priority Data

Dec. 29, 2003 (KR) ............... 10-2003-0099432

(51) Int. Cl.
G02F 1/1343 (2006.01)

(52) U.S. Cl. .............. 349/141; 349/144; 349/38; 349/39

(58) Field of Classification Search .......... 349/141, 349/144
See application file for complete search history.

(56) References Cited

U.S. PATENT DOCUMENTS

| | | | | |
|---|---|---|---|---|
| 4,345,249 A | * | 8/1982 | Togashi | 345/103 |
| 5,977,562 A | * | 11/1999 | Hirakata et al. | 257/72 |
| 6,384,888 B2 | * | 5/2002 | Komatsu | 349/141 |
| 6,940,480 B2 | * | 9/2005 | Lu | 345/92 |
| 2001/0013915 A1 | * | 8/2001 | Song | 349/141 |
| 2003/0133066 A1 | * | 7/2003 | Ono et al. | 349/141 |

FOREIGN PATENT DOCUMENTS

| | | |
|---|---|---|
| JP | 63-21907 B2 | 5/1988 |
| JP | 11-125835 | 5/1999 |
| JP | 2003-295210 | 10/2003 |
| KR | 10-0268104 | 7/2000 |
| WO | WO/96/00408 | 1/1996 |

* cited by examiner

*Primary Examiner*—David Nelms
*Assistant Examiner*—Lauren Nguyen
(74) *Attorney, Agent, or Firm*—McKenna Long & Aldridge LLP

(57) ABSTRACT

A substrate for a liquid crystal display includes a gate line on a substrate, first and second data lines crossing the gate line, a common line between the first and second data lines, wherein the common line, the gate line and the first data line define a first pixel region, and the common line, the gate line and the second data line define a second pixel region, a thin film transistor in each of the first and second pixel regions, the thin film transistor having a gate electrode, a source electrode and a drain electrode, a pixel electrode in each of the first and second pixel regions, the pixel electrode connected with the thin film transistor, and a common electrode between the pixel electrode and each of the first and second data lines, the common electrode connected to the common line.

6 Claims, 10 Drawing Sheets

IPS LCD HAVING AUXILIARY COMMON ELECTRODE LINES

The present invention claims the benefit of Korean Patent Application No. 2003-99432 filed on Dec. 29, 2003, which is hereby incorporated by reference for all purposes as if fully set forth herein.

BACKGROUND OF THE INVENTION

1. Field of the Invention

The present invention relates to a liquid crystal display (LCD), and more particularly, to an in-plane switching mode (IPS) LCD and fabricating method thereof.

2. Discussion of the Related Art

Until recently, display devices generally employed cathode-ray tubes (CRTs). Presently, many efforts are being made to study and develop various types of flat panel displays, such as liquid crystal displays (LCDs), plasma display panels (PDPs), field emission displays (FEDs), and electro-luminescence displays (ELDs), as substitutions for CRTs.

Of these flat panel displays, the LCD has high resolution images, lightness, thin profile, compact size, and low voltage power supply requirements.

In general, a vertical alignment mode (VA) LCD has been employed. The VA LCD includes two substrates that are spaced apart and face each other, and a liquid crystal material layer interposed between the two substrates. Each of the two substrates includes electrodes that face each other, wherein a voltage supplied to each of the electrodes induces an electric field to the liquid crystal material layer. Accordingly, alignment of liquid crystal molecules of the liquid crystal material layer is changed by varying an intensity or direction of the induced electric field, thereby changing light transmissivity through the liquid crystal material layer. Thus, the VA LCD displays images by varying the induced electric field. However, since the VA LCD is driven by the induced electric field between the two substrates, the VA LCD has a low viewing-angle.

To improve the low viewing-angle of the VA LCD, an in-plane switching mode (IPS) LCD has been employed.

FIG. 1 is a cross-sectional view of an IPS LCD according to the related art.

In FIG. 1, an IPS LCD includes a color filter substrate 10, an array substrate 20, and a liquid crystal material layer 30 interposed between the two substrates 10 and 20.

Since a common electrode 52 and a pixel electrode 62 are disposed in the array substrate 20, a voltage supplied to each of the electrodes induces an in-plane electric field 26 to the liquid crystal material layer 30.

FIGS. 2A and 2B are cross-sectional views of off and on-states of an IPS LCD according to the related art, respectively.

In FIG. 2A, when an IPS LCD has an off-state, each of a common electrode 52 and a pixel electrode 62 is not supplied with a voltage, and thus an in-plane electric field is not induced. Accordingly, alignment of a liquid crystal molecule 32 is not changed, but remains to be directed along a rubbing direction R. The rubbing direction R has an angle of about 10 to 20 with the common electrode 52 or the pixel electrode 62.

In FIG. 2B, when the IPS LCD has an on-state, each of the common electrode 52 and the pixel electrode 62 is supplied with a voltage, and thus the in-plane electric field 26 is induced. The in-plane electric field 26 is induced between the common electrode 52 and the pixel electrode 62. Accordingly, alignment of the liquid crystal molecules 32a over the common electrode 52 and the pixel electrode 62 is not changed, and alignment of the liquid crystal molecules 32b between the common electrode 52 and the pixel electrode 62 is changed to the induced in-plane electric field 26.

In the IPS LCD, alignment of the liquid crystal molecules is changed depending on the in-plane electric field. Accordingly, the IPS LCD has a high viewing-angle.

FIG. 3 is a plan view of an array substrate for an IPS LCD according to the related art.

In FIG. 3, in an array substrate, a gate line 60 and a data line 70 cross each other to define a pixel region P, and a thin film transistor Tr is disposed at the crossing of the gate and data lines 60 and 70. A common line 80 is apart from the gate line 60, and a common electrode 85 is connected with the common line 80. A pixel electrode 95 is connected with the thin film transistor Tr, and is disposed between the adjacent common electrodes 85.

FIGS. 4 and 5 are cross-sectional views taken along lines A-A and B-B of FIG. 3, respectively.

In FIGS. 4 and 5, a gate line 60 (in FIG. 3), a gate electrode 61, a common line 80 (in FIG. 3) and a common electrode 85 are disposed on a substrate 57. A gate insulating layer 62 is disposed on the substrate 57 having the gate electrode 61. A semiconductor pattern 64 is disposed on the gate insulating layer 62 in a thin film transistor Tr, and includes an active layer 64a and an ohmic contact layer 64b, which are made of intrinsic amorphous silicon and doped amorphous silicon, respectively. A source electrode 66 and a drain electrode 68 are disposed on the semiconductor pattern 64, and a data line 70 is disposed on the gate insulating layer 62. A passivation layer 76 having a drain contact hole 77 is disposed on the substrate 57 having the source and drain electrodes 66 and 68. A pixel electrode 95 is disposed on the passivation layer 76, and contacts the drain electrode 68 through the drain contact hole 77.

In the related art IPS LCD, a voltage applied to the data line may interfere with a voltage applied to the pixel electrode. Accordingly, there is difference of transmissivities of a white color and a gray color, and thus cross-talk phenomenon occurs.

To minimize cross-talk phenomenon, the common electrode adjacent to the data line has a width of about 10 um, and the common line is disposed apart from the gate line with a predetermined space. As such, the common electrode and the common line occupy a large portion of the pixel region. Accordingly, in the related art IPS LCD, aperture ratio and brightness are reduced.

SUMMARY OF THE INVENTION

Accordingly, the present invention is directed to an in-plane switching mode liquid crystal display that substantially obviates one or more of the problems due to limitations and disadvantages of the related art.

An advantage of the present invention is to provide an in-plane switching mode liquid crystal display that can prevent cross-talk phenomenon, and increase aperture ratio and brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate for a liquid crystal display includes a gate line on a substrate, first and second data lines crossing the gate line, a common line between the first and second data lines, wherein the common line, the gate line and the first data line define a first pixel region, and the common line, the gate line and the second data line define a second pixel region, a thin film transistor in each of the first and second pixel regions, the thin film transistor having a gate electrode, a source electrode and a drain electrode, a pixel electrode in each of the first and second pixel regions, the pixel electrode connected to the thin film transistor, and a common electrode between the pixel electrode and each of the first and second data lines, the common electrode connected to the common line.

In another aspect, a substrate for a liquid crystal display includes first and second data lines on a substrate, a gate line crossing each of the first and second data lines, a common line between the first and second data lines, a thin film transistor at a crossing of the gate line and each of the first and second data lines, a pixel electrode connected to the thin film transistor, and a common electrode between the pixel electrode and each of the first and second data lines, the common electrode connected with the common line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
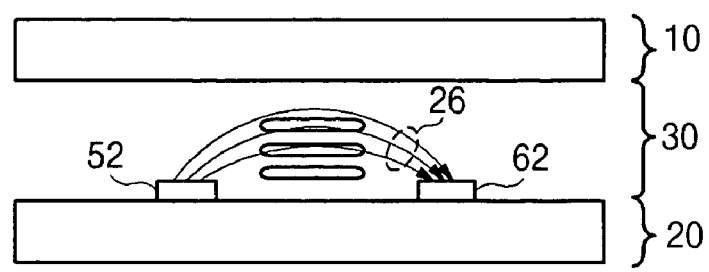
FIG. 1 is a cross-sectional view of an IPS LCD according to the related art.
Figure 2A:
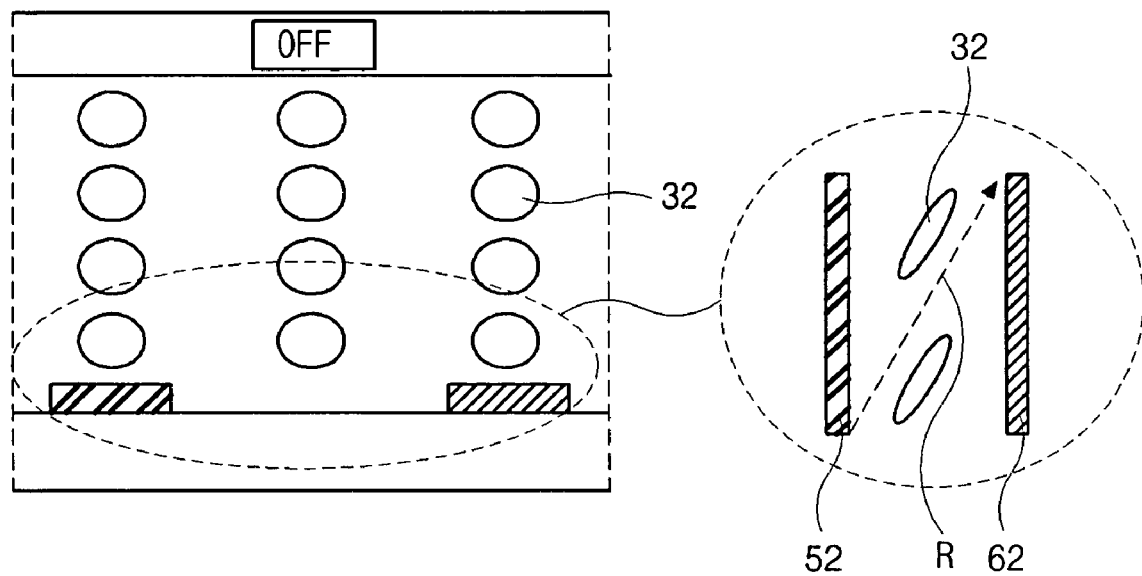
FIGS. 2A and 2B are cross-sectional views of "off" and "on"-states of an IPS LCD according to the related art, respectively.
Figure 2B:
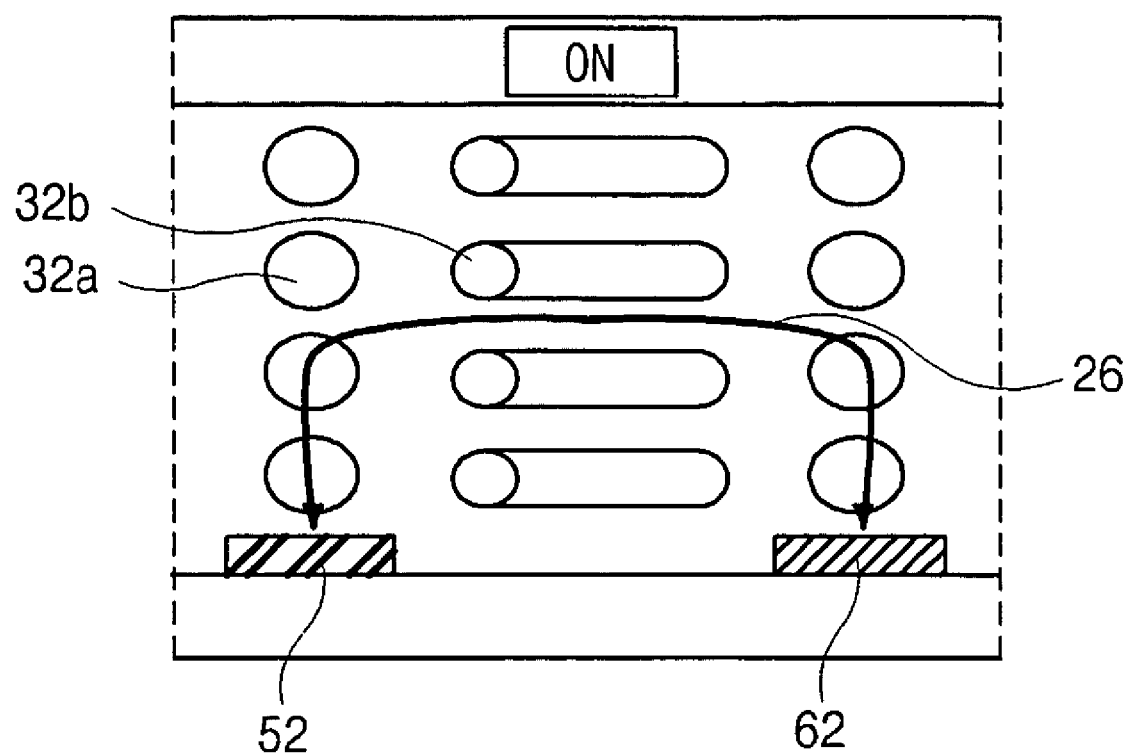
Figure 3:
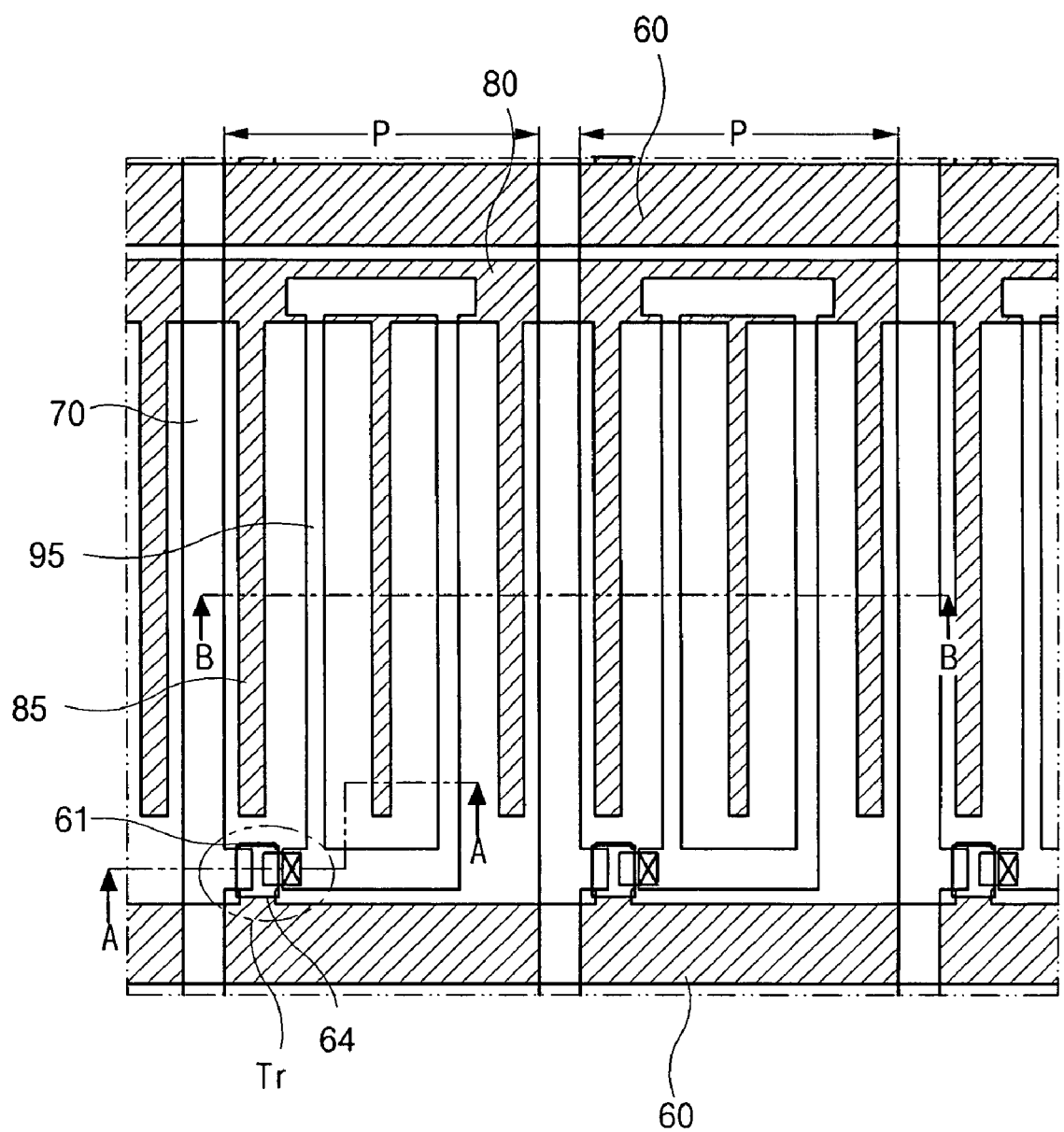
FIG. 3 is a plan view of an array substrate for an IPS LCD according to the related art.
Figure 4:
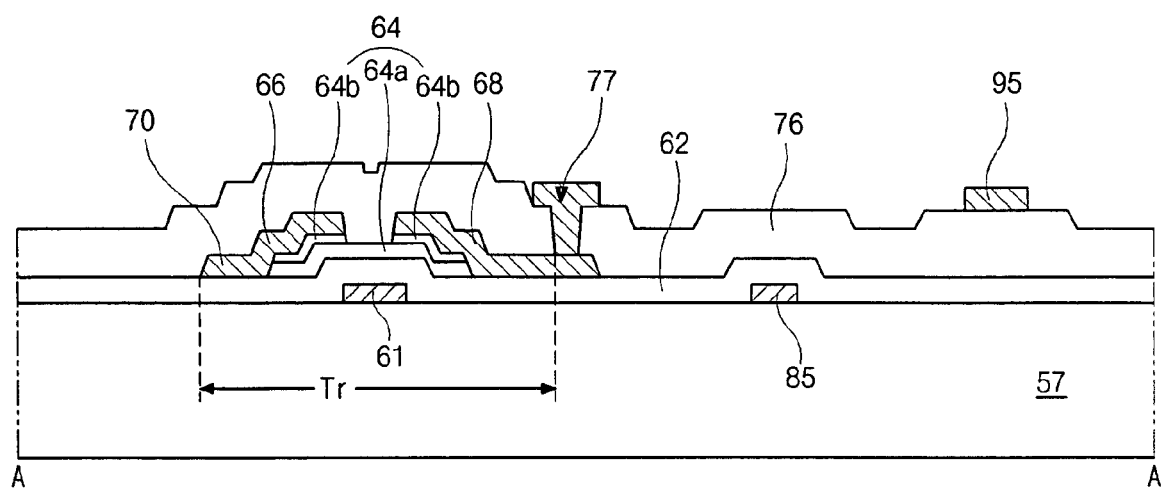
FIGS. 4 and 5 are cross-sectional views taken along lines A-A and B-B of FIG. 3, respectively.
Figure 5:
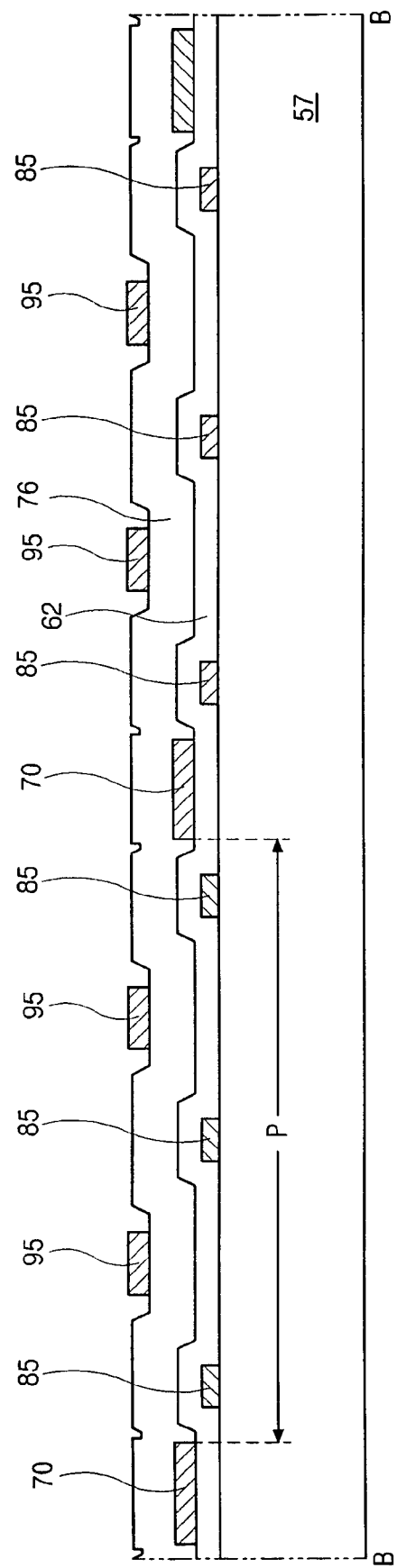
Figure 6:
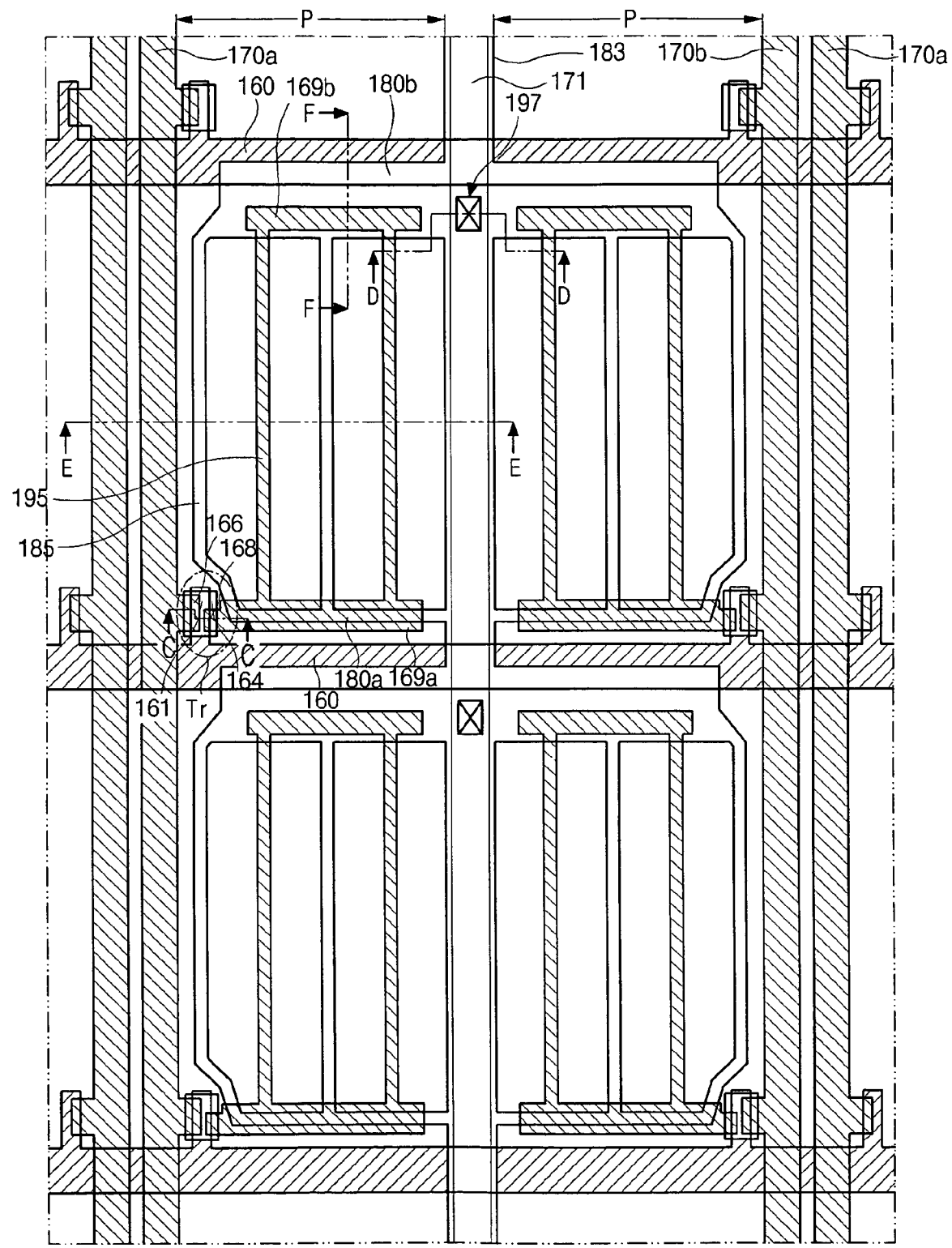
FIG. 6 is a plan view of an array substrate for an in-plane switching mode (IPS) liquid crystal display (LCD) according to the present invention.
Figure 7:
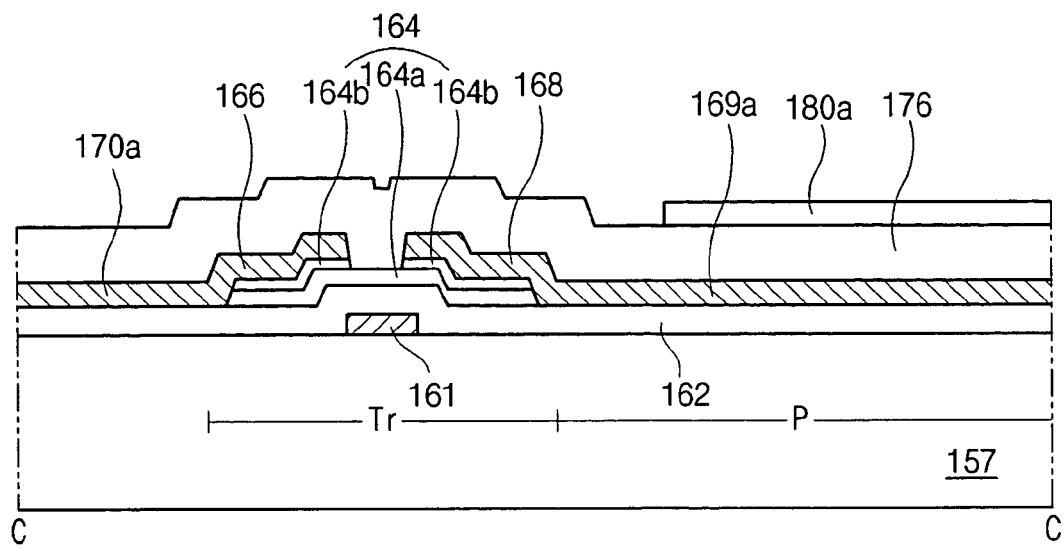
FIGS. 7 to 10 are cross-sectional views taken along lines C-C, D-D, E-E and F-F of FIG. 6, respectively.
Figure 8:
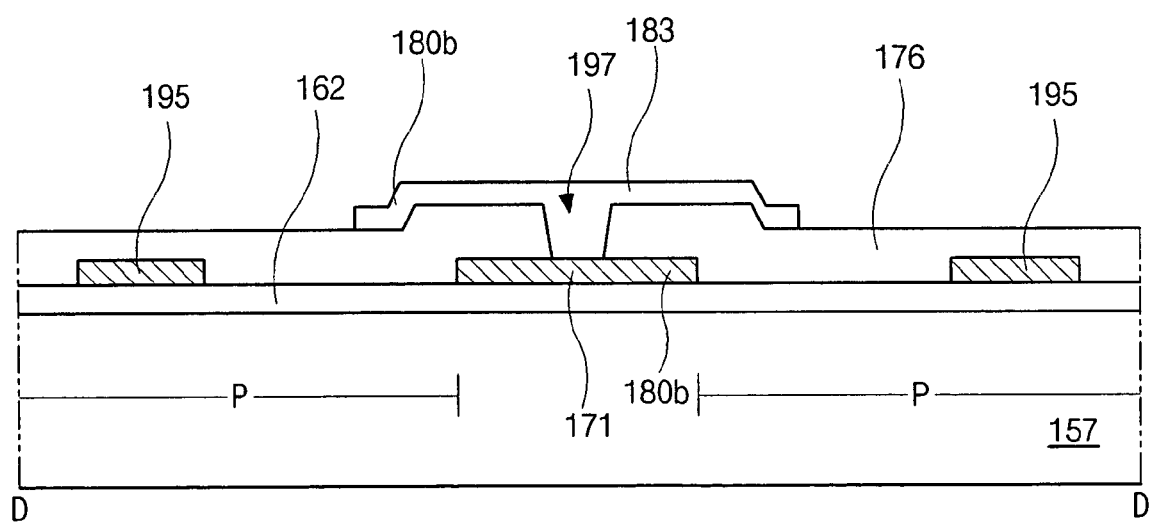
Figure 9:
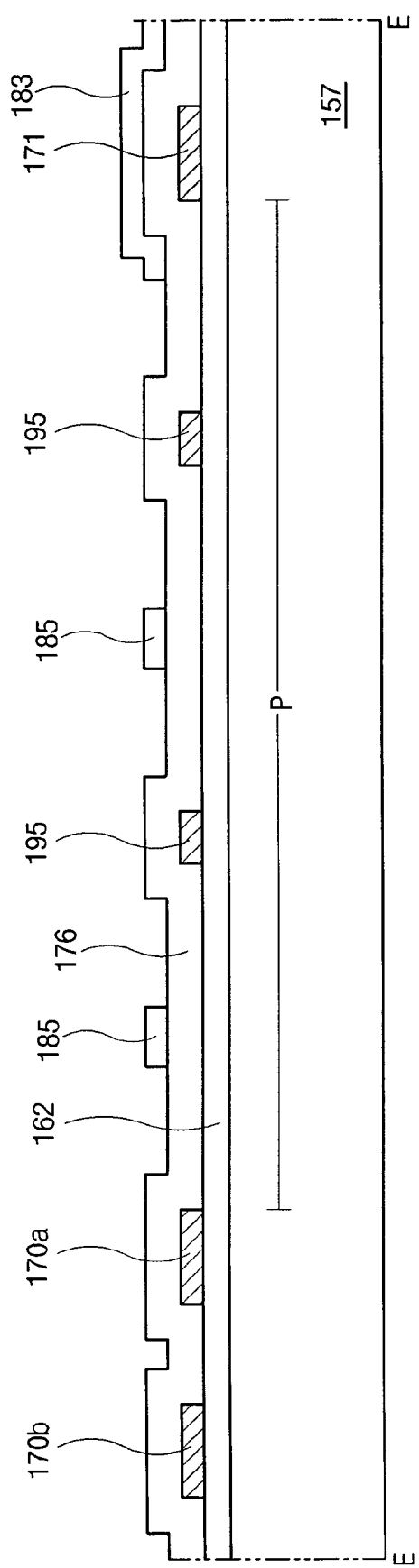
Figure 10:
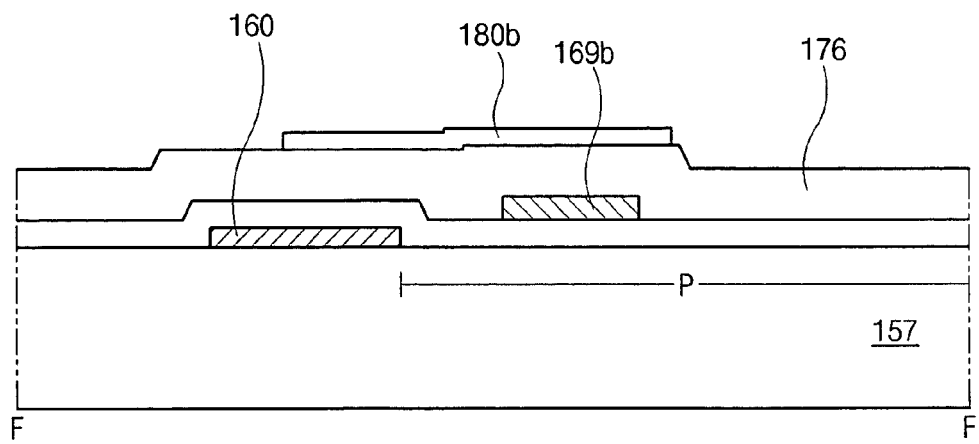

FIG. 6 is a plan view of an array substrate for an in-plane switching mode (IPS) liquid crystal display (LCD) according to the present invention.

In the array substrate of the IPS LCD of FIG. 6, a gate line 160 and a data line 170 cross each other. The data line 170 includes a first data line 170a and a second data line 170b. Between the first and second data lines 170a and 170b, a common line 171 is disposed. Accordingly, the gate line 160, the data line 170, and the common line 171 define a pixel region P at both sides of the common line 171.

In the pixel region P, a thin film transistor Tr is disposed at the crossing of the gate line 160 and the data line 170. The thin film transistor Tr includes a gate electrode 161 connected to the gate line 160, a semiconductor pattern 164, a source electrode 166 connected to the data line 170, and a drain electrode 168 spaced apart from the source electrode 166.

A pixel electrode 195 is connected to the drain electrode 168 through a first connection electrode 169a disposed at a lower portion of the pixel region P. The pixel electrodes 195 in the pixel region P are connected through a second connection electrode 169b disposed at an upper portion of the pixel region P. The pixel electrode 195, and the first and second connection electrodes 169a and 169b may be disposed at the same layer as the drain electrode 168.

A common electrode 185 is spaced apart from and parallel to the pixel electrode 195. The common electrodes 185 in the pixel region P are connected through third and fourth connection electrodes 180a and 180b disposed at lower and upper portions of the pixel region P, respectively. The third and fourth connection electrodes 180a and 180b are connected with an auxiliary common line 183 overlapping the common line 171. The common line 171 may be disposed at the same layer as the data line 170, and the auxiliary common line 183, and the third and fourth connection electrodes 180a and 180b may be disposed at the same layer and be made of a transparent conductive material such as indium-tin-oxide (ITO) and indium-zinc-oxide (IZO). The common line 171 and the auxiliary common line 183 are connected through a contact hole 197, and thus the common electrode 185 is supplied with a common voltage. The common line 171 and the auxiliary common line 185 act as a common electrode.

The first and second connection electrodes 169a and 169b may overlap the third and fourth connection electrodes 180a and 180b, respectively, and thus the connection electrodes overlapping each other may define storage capacitors.

In the array substrate of FIG. 6, the first and second data lines 170a and 170b are disposed at both sides of the common line 171, and thus pixel regions P at both sides of the common line 171 are symmetrical.

FIGS. 7 to 10 are cross-sectional views taken along lines C-C, D-D, E-E and F-F of FIG. 6, respectively.

In FIGS. 7 to 10, a gate line 160, and a gate electrode 161 extended from the gate line 160 are disposed on a substrate 157. A gate insulating layer 162 is disposed on the substrate 157 having the gate line 160.

A semiconductor pattern 164 is disposed on the gate insulating layer 162 corresponding to the gate electrode 161. The semiconductor pattern 164 includes an active layer 164a of intrinsic amorphous silicon on the gate insulating layer 162, and an ohmic contact layer 164b of doped amorphous silicon on the active layer 164a.

A data line 160, a source electrode 166 extended from the data line 160, a drain electrode 168, a common line 171, and a pixel electrode 195 are disposed on the substrate 157 having the semiconductor pattern 164. Furthermore, first and second connection electrodes 169a and 169b are disposed at the same layer as the pixel electrode 195 to connect the pixel electrodes 195 together.

A passivation layer 176 is disposed on the substrate 157 having the pixel electrode 195. The passivation layer 176 has a contact hole 197 exposing the common line 171.

An auxiliary common line 183 and a common electrode 185 are disposed on the passivation layer 176. The auxiliary common line 183 overlap the common line 171 and is connected to the common line 171 through the contact hole 197.

The pixel electrodes 195 are disposed between the adjacent common electrodes 185, and between the common electrode 185 and the common line 171. Furthermore, third and fourth connection electrodes 180a and 180b are disposed at the same layer as the common electrode 195 to connect the common electrodes 185 together.

In the above array substrate for the IPS LCD, since the common line instead of the data line is disposed between the adjacent pixel regions, a number of the common electrodes adjacent to the data line can be less by about a half than that in the related art. Furthermore, since the common line and the gate line are disposed at different layers, the common line can have a smallest width. Accordingly, an occupation area of the common electrodes and the common line can be reduced, and thus aperture ratio and brightness can increase.

Additionally, since the common line instead of the data line is disposed between the adjacent pixel regions, the data line can not interfere in the pixel electrode adjacent to the common line. Furthermore, since the adjacent data lines have different polar voltages, interference of the adjacent data lines in the pixel electrode can be cancelled. Accordingly, interference of the data line in the pixel electrode can be cancelled, and thus cross-talk phenomenon can be minimized.

Figure 11:
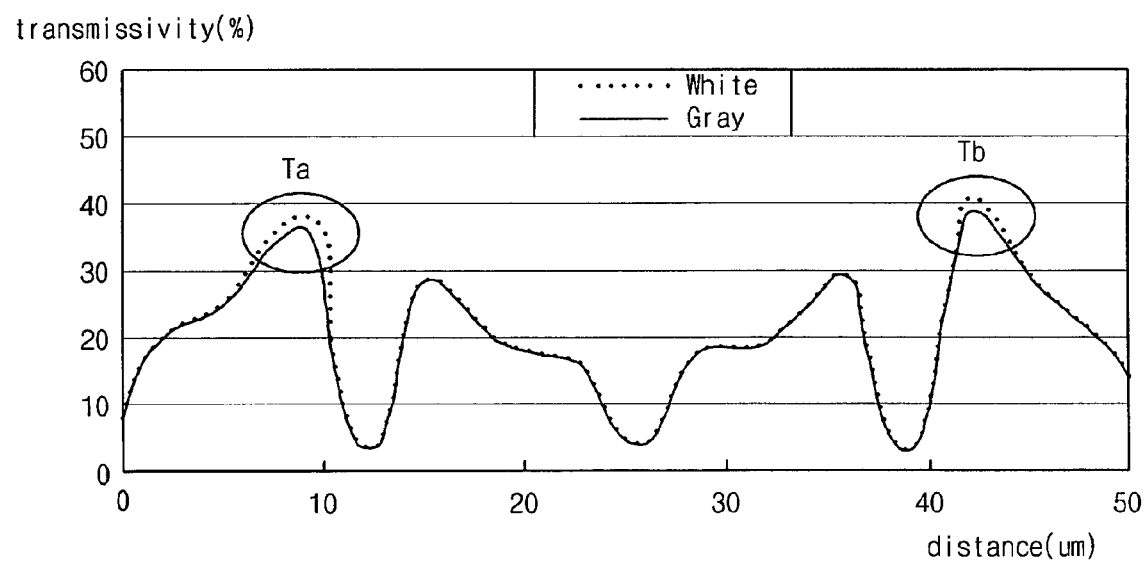
FIGS. 11 and 12 are graphs showing transmissivities of an IPS LCD according to the related art and the present invention, respectively.
Figure 12:
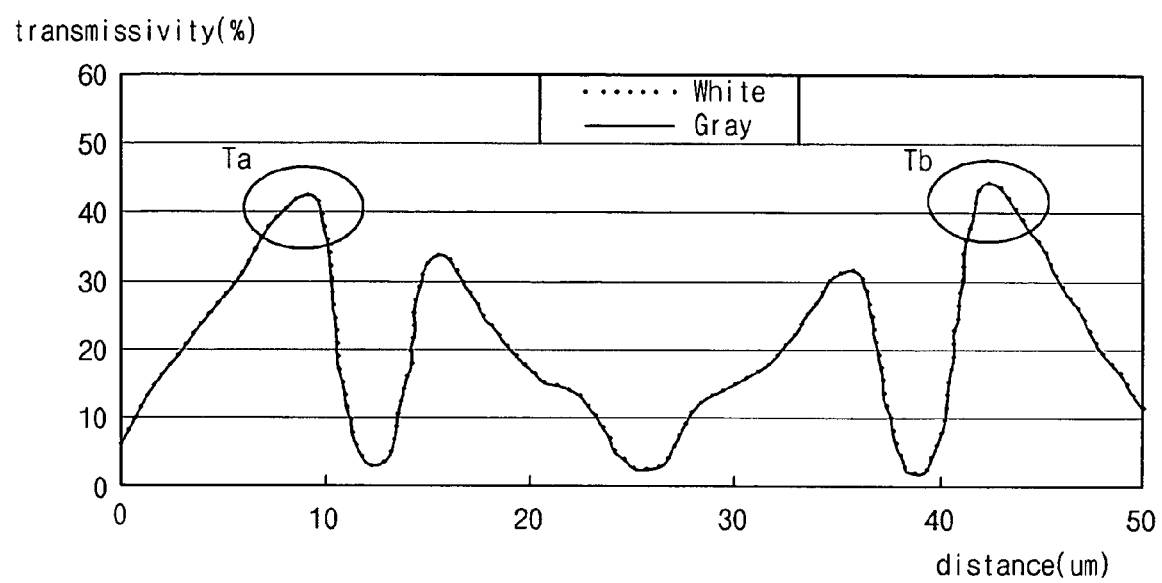

FIGS. 11 and 12 are graphs showing transmissivities of an IPS LCD according to the related art and the present invention, respectively.

In the graphs of FIGS. 11 and 12, a horizontal axis represents a distance from the common electrode adjacent to the data line in the pixel region, and a vertical axis represents a transmissivity. In the graphs, at portions near 0% transmissivity, the common electrode and the pixel electrode are disposed. Furthermore, a dotted line and a solid line represent a white color transmissivity and a gray color transmissivity, respectively.

In FIG. 11, a gray color transmissivity and a white color transmissivity are different from each other in a pixel region, more particularly, at both portions Ta and Tb where transmissivities are near highest. The reason for different transmissivity in the related art is that the data line adjacent to the common electrode interferes with the pixel electrode. More particularly, since the pixel region is defined by the adjacent data lines, the adjacent data lines interface with both portions Ta and Tb.

In FIG. 12, the gray color transmissivity and the white color transmissivity are near equal to each other in a pixel region. The reason for the near equal transmissivity in the present invention is that, as explained above, interference of the adjacent data lines having different polar voltages in the pixel electrode is cancelled. Furthermore, the common line rather than the data line is disposed between the adjacent pixel regions. Accordingly, the gray color transmissivity and the white color transmissivity can be near equal in the pixel region, more particularly, at both portions Ta and Tb.

In addition to equality of the gray color transmissivity and the white color transmissivity, overall transmissivity in the present invention is higher than that in the related art.

The difference of the gray color transmissivity and the white color transmissivity relates to cross-talk, which is expressed by a following quantitative expression: $C/T = |T(white) - T(gray)|/T(gray)$ (where C/T is cross-talk, T(white) is a white color transmissivity, and T(gray) is a gray color transmissivity).

Table 1 shows cross-talk measurements based on a width of the common electrode adjacent to the data line using the above quantitative expression in the related art and the present invention, respectively.

TABLE 1

| | | a width of the common electrode adjacent to the data line | | | | |
|---|---|---|---|---|---|---|
| | | 8 um | 7 um | 6 um | 5 um | 4 um |
| cross-talk | the related art | 1.62% | | | | |
| | the present invention | 0.43% | 0.59% | 0.91% | 1.20% | 1.71% |

In Table 1, when a width of the common electrode is about 8 um, cross-talk in the related art is about 1.62%. However, cross-talk in the present invention is about 0.43%, i.e. less by about a quarter than that in the related art.

Accordingly, even though the common electrodes in the present invention and the related art are equal to each other, cross-talk in the present invention is less than that in the related art. Therefore, the common electrode in the present invention can have a smaller width than that in the related art, and thus aperture ratio and brightness can increase.

In the IPS LCD of the present invention, the general color filter substrate having red, green and blues color filters may be employed.

It will be apparent to those skilled in the art that various modifications and variations can be made in the above-discussed display device and the driving method thereof without departing from the spirit or scope of the invention. Thus, it is intended that the present invention cover the modifications and variations of this invention provided they come within the scope of the appended claims and their equivalents.

What is claimed is:

1. A substrate for a liquid crystal display (LCD), comprising:
    a gate line on a substrate along a first direction;
    first and second data lines along a second direction and crossing the gate line;
    a common line between the first and second data lines, wherein the common line, the gate line and the first data line define a first pixel region, and the common line, the gate line and the second data line define a second pixel region, wherein the common line is disposed at a same layer as the first and second data lines;
    a thin film transistor in each of the first and second pixel regions, the thin film transistor having a gate electrode, a source electrode and a drain electrode;
    a pixel electrode in each of the first and second pixel regions, the pixel electrode connected with the thin film transistor;
    first and second connection electrodes extending from the pixel electrode along the first direction and disposed at both end portions of the pixel electrode, respectively, wherein the first connection electrode connects the thin film transistor and the pixel electrode, wherein the pixel electrode is connected to the drain electrode through the first connection electrode;
    a passivation layer directly on the common line and covering the thin film transistor and the pixel electrode, the passivation layer having a contact hole that exposes the common line;
    a common electrode on the passivation layer and between the pixel electrode and each of the first and second data lines;
    an auxiliary common line on the passivation layer, the auxiliary common line overlapping and connected to the common line through the contact hole, the auxiliary common line parallel to the first and second data lines and crossing the gate line, the auxiliary common line completely covering the common line; and third and fourth connection electrodes on the passivation layer, extending from the auxiliary common line along the first direction, and connecting the auxiliary common line and the common electrode, wherein the third and fourth connection electrodes are disposed at both end portions of the common electrode, respectively, wherein the first connection electrode overlaps the third connection electrode and forms a first storage capacitor with the passivation layer therebetween, and the second connection electrode overlaps the fourth connection electrode and forms a second storage capacitor with the passivation layer therebetween.

2. The substrate according to claim 1, wherein the common line is disposed on a portion of the gate line.

3. The substrate according to claim 1, wherein the common electrode is disposed on the common line.

4. The substrate according to claim 3, wherein the common electrode is made of a transparent conductive material.

5. The substrate according to claim 1, wherein the pixel electrode is disposed at the same layer as the first and second data lines.

6. A substrate for a liquid crystal display (LCD), comprising:

first and second data lines on a substrate along a first direction;

a gate line along a second direction and crossing each of the first and second data lines;

a common line between the first and second data lines, wherein the common line is disposed at a same layer as the first and second data lines;

a thin film transistor at a crossing of the gate line and each of the first and second data lines;

a pixel electrode connected to the thin film transistor;

first and second connection electrodes extending from the pixel electrode along the second direction and disposed at both end portions of the pixel electrode, respectively, wherein the first connection electrode connects the thin film transistor and the pixel electrode, wherein the pixel electrode is connected to a drain electrode of the thin film transistor through the first connection electrode;

a passivation layer directly on the common line and covering the thin film transistor and the pixel electrode, the passivation layer having a contact hole that exposes the common line;

a common electrode on the passivation layer and between the pixel electrode and each of the first and second data lines;

an auxiliary common line on the passivation layer, the auxiliary common line overlapping and connected to the common line through the contact hole, the auxiliary common line parallel to the first and second data lines and crossing the gate line, the auxiliary common line completely covering the common line; and third and fourth connection electrodes on the passivation layer, extending from the auxiliary common line along the second direction, and connecting the auxiliary common line and the common electrode, wherein the third and fourth connection electrodes are disposed at both end portions of the common electrode, respectively, wherein the first connection electrode overlaps the third connection electrode and forms a first storage capacitor with the passivation layer therebetween, and the second connection electrode overlaps the fourth connection electrode and forms a second storage capacitor with the passivation layer therebetween.

* * * * *